United States Patent [19]

Launie

[11] 4,315,681

[45] Feb. 16, 1982

[54] CAMERA WITH LENS DISC STOPPING SYSTEM

[75] Inventor: Kenneth J. Launie, Stoneham, Mass.

[73] Assignee: Polaroid Corporation, Cambridge, Mass.

[21] Appl. No.: 222,012

[22] Filed: Jan. 2, 1981

[51] Int. Cl.$^3$ .................. G03B 13/20; F16H 53/00
[52] U.S. Cl. .......................... 354/197; 354/354; 74/567; 74/577 S
[58] Field of Search .............. 354/25, 25 A, 31 F, 354/121, 123, 124, 195, 197, 202, 354; 352/140, 142; 355/56; 74/10.2, 567, 577 S; 192/142 R

[56] References Cited

U.S. PATENT DOCUMENTS 4,243,309  1/1981  Johnson et al. ................ 354/197

Primary Examiner—Joseph W. Hartary
Assistant Examiner—William B. Perkey
Attorney, Agent, or Firm—John S. Vale

[57] ABSTRACT

A camera including an automatic lens focusing system, wherein a disc holding a plurality of different lens elements is rotated to sequentially present the lens elements at a focusing system, is provided with a disc stopping arrangement comprising a plurality of notches in a peripheral section of the disc and a pawl having a tang therein configured to be received in a selected one of the notches to stop disc rotation and locate a corresponding one of the lens elements at the focusing position. The outer edge portion of the disc, the notches and the pawl tang are specially configured so as to stabilize the pawl prior to tang entry into a notch and to efficiently dissipate inertial energy of the disc.

5 Claims, 10 Drawing Figures

CAMERA WITH LENS DISC STOPPING SYSTEM

BACKGROUND OF THE INVENTION

The present invention relates to the field of photography and, more particularly, to a camera including an automatic lens focusing system.

Commonly-assigned U.S. Pat. No. 4,167,316 and copending applications U.S. Ser. Nos. 017,196, and 017,425, now U.S. Pat. No. 4,243,309, both filed on Mar. 5, 1979, and U.S. Ser. No. 156,044, filed on June 3, 1980, disclose cameras of the type including an automatic lens focusing system that is formed in party by a sonic ranging system for measuring the photographic subject-to-camera distance.

Typically, the lens focusing system includes a plurality of discrete lens elements, each having a different focal length, mounted in circumferentially spaced apart relation on a lens holding disc for rotation about a disc center axis to sequentially present the lens elements at a focusing position for focusing image forming light rays emanating from a subject located within a corresponding subject-to-camera distance range at the camera's film plane.

As the sonic ranging system (which may be of the type described in commonly-assigned U.S. Pat. No. 4,199,246) operates, the disc is accelerated by the arm of a torsion spring or the end of a pivoting actuator member to impart rotary motion thereto. After receipt of an echo signal from the subject indicative of subject distance, a disc pawl operates to engage a corresponding one of a plurality of notches or tabs disposed about the periphery of the disc to thereby stop disc motion and locate the lens element corresponding to the indicated distance range at the focusing position.

Those skilled in the photographic art will appreciate that a lapsed time period from the beinning to the end of the automatic lens focusing portion of the camera cycle is relatively short. Typically, with a lens disc having four separate lens elements thereon, the lens pawl stops the disc to locate the first element at the focusing position within approximately 25 milliseconds after cycle initiation. The elapsed time for stopping the last of the four lens elements at the focusing position is approximately 80 milliseconds.

To insure that such rapid operation is performed reliably on a consistent basis, it is essential for the lens drive system to quickly and smoothly accelerate the lens disc to a substantially constant rotational velocity and for the disc or lens pawl to interact dynamically with the disc and the notches therein in a consistent and reliable manner to stop the disc by dissipating its inertial energy in such a way as to minimize disc oscillation and also to stabilize the position of the disc at each of its four focusing locations to accurately align the corresponding one of the lens elements with an exposure opening leading to the film plane.

In the previously-noted U.S. Pat. No. 4,167,316 the disc is provided with a series of tabs on the peripheral section extending outwardly in a direction transverse to the plane of rotation of the disc and the lens pawl includes a stop thereon which moves into the locus of travel of the tabs on stop disc rotation at the appropriate time. After engagement of the stop with one of the tabs, a torsion spring rotates the disc in the opposite direction so that the stop then becomes engaged with the tab associated with the next adjacent lens to locate it at the focusing position. The very nature of this action necessarily includes some disc bounce and oscillation which may lead to undesirable variation in the actual stopping time of the lens disc in each of its four focusing positions.

In the previously-noted copending applications, the disc is provided with notches having a shape that is generally complementary to the shape of the tang on the lens pawl. Initially, the pawl is in a retracted position so that the tang is outside of the locus of travel of the disc peripheral edge. In response to the echo signal indication, the lens pawl is pivoted toward the disc so that the tang rides along the edge of the disc in between adjacent notches until its leading edge engages a corresponding angled camming surface on the notch whereby it is cammed down into the notch to stop disc rotation. It will be noted that the peripheral edge in between adjacent notches radiates inwardly toward the notch to promote radially inward movement of the tang in preparation for its receipt into the approaching notch. However, such movement of the lens pawl caused by the changing radius of the peripheral edge may lead to a certain amount of instability in the lens pawl which could adversely effect the movement of the tang into the notch. Also, the complementary camming surfaces along the sides of the notch and tang have to be critically aligned so as not to bind, therefore making the piece parts more complex and expensive than is necessary.

Therefore, it is a primary object of the invention to provide a camera which includes such an automatic lens focusing position wherein the peripheral section of the disc including the notches and the tang on the lens pawl are configured to facilitate smooth cooperative operation to stop rotation of the lens disc in a more consistent and reliable manner.

Other objects of the invention will, in part, be obvious and will, in part, appear hereinafter.

SUMMARY OF THE INVENTION

The present invention provides a camera including an automatic lens focusing system of the general type previously described for automatically focusing image forming light rays from a photographic subject at the camera film plane.

The disc holding the plurality of lens elements in circumferentially spaced apart relation thereon includes a peripheral section having a plurality of open outer end tang receiving notches therein extending generally inwardly from an outer edge portion of the disc. Each of the notches is arranged in predetermined angular relation to a corresponding one of the lens elements and is also configured to include a leading side cam surface set at a cam angle with negative rake; an oppositely spaced trailing side cam surface set at a cam angle with positive rake and extending further out in a radial direction than the leading side cam surface; a bottom surface; and a generally concave energy dissipating transition ramp surface extending between a lower portion of the trailing side cam surface and the bottom surface. The outer edge portion is set at a constant radial distance from the axis between notches except in the vicinity of the outer ends of the trailing side cam surfaces where it protrudes outwardly to accommodate the extended portion of the trailing side cam surfaces.

A lens pawl is responsive to the provision of the echo signal indication for stopping rotation of the disc to locate a corresponding one of the lens elements at the focusing position. The pawl is mounted for pivotal motion toward and away from the peripheral section of the disc and includes thereon a tang configured to be releasably received in any one of the disc notches to stop disc rotation and inhibit further rotation until it is removed from the notch.

The tang is configured to include a leading side surface having a positive rake angle that is greater than the cam angle of the trailing side cam surface of the notches; a trailing side surface having a negative rake angle that is greater than the cam angle of the leading side cam surface, and a concave bottom surface. The bottom surface has a radius of curvature that is smaller than the radius of curvature of the disc outer edge portion between notches and joins the lower ends of the tang leading and trailing side surfaces thereby defining leading and trailing end tang cam follower tips. The span between the leading and trailing tips is narrower than the width of the notch opening.

The pawl is initially locatable in a disengaged position where the tang is spaced outwardly from the outer edge portion to allow rotation of the disc therepast. In response to the echo signal indication, it is actuable to pivot toward the disc so that at least one of the leading and trailing end tips engages the outer edge portion of the disc between adjacent notches ahead of an approaching one of the notches and rides therealong whereby the lens pawl is maintained in a stabilized condition due to the constant radius of the outer edge portion until the leading end tip of the tang is engaged by the extended portion of the trailing side cam surface of the approaching notch. Thereupon, in response to further disc rotation toward the focusing position, the leading end tip follows the trailing side cam surface and thereafter the concave ramp section to effect camming action of the tang down into the notch to initiate stopping of disc rotation. The trailing end tip of the tang in the leading side cam surface of the notch also act to cam the tang into the notch when engaged in response to oscillating action of the disc due to abrupt disc deceleration when the tang enters the notch.

The disc further includes means for biasing the disc back towards the initial position and this counter rotation of the disc serves to hold the leading side cam surface of the notch in contact with the trailing end tip of the tang located therein to accurately position the disc and thereby locate the corresponding lens element at the focusing position.

It has been found that the provision of the concave ramp section in the notch substantially aids in the dissipation of the inertial enery of the disc to facilitate stopping disc rotation with a minimum of oscillation.

Other aspects of the camera disclosed herein are disclosed and claimed in commonly-assigned copending applications U.S. Ser. Nos. 222,011 and 222,013 filed on even date herewith.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
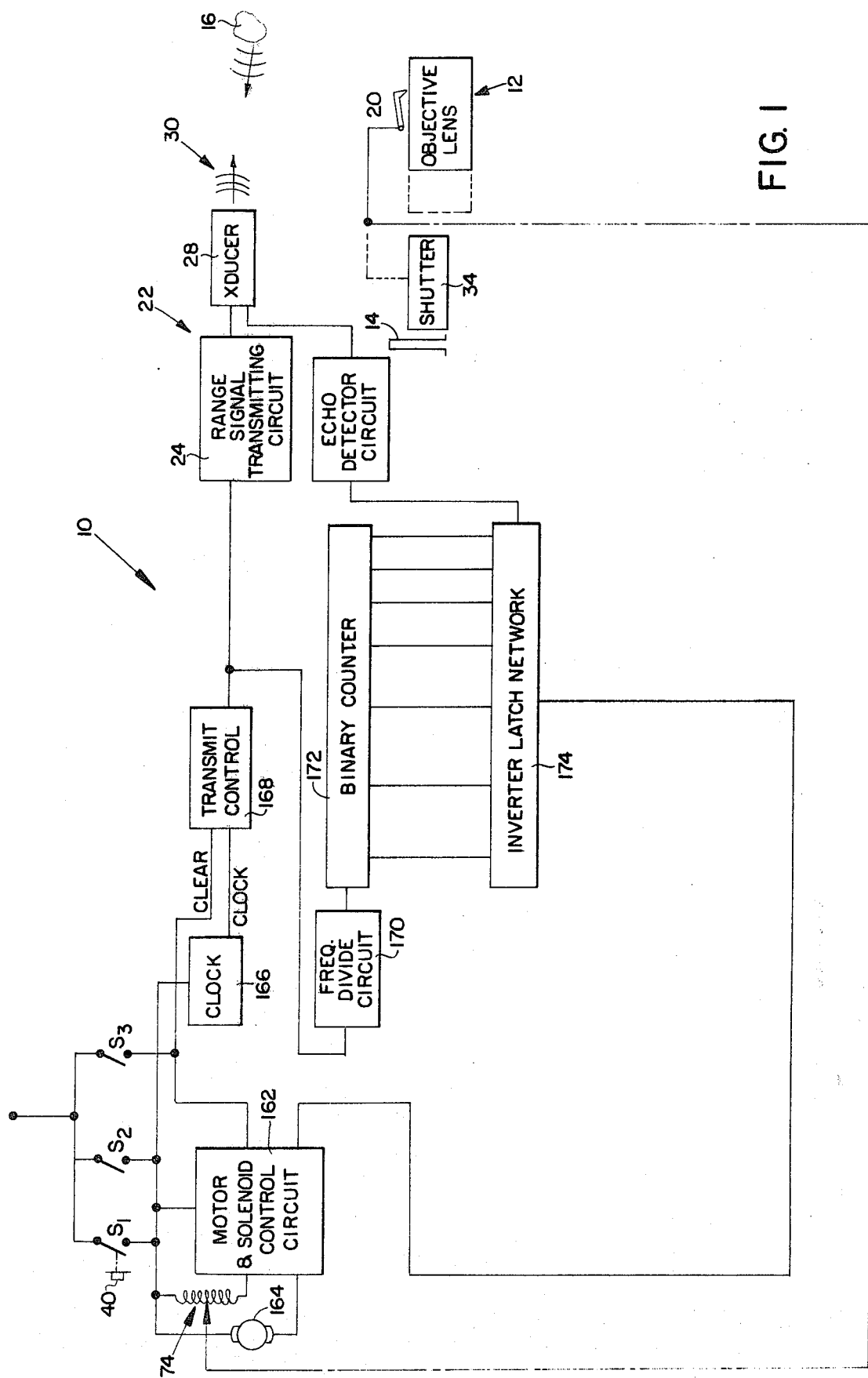
FIG. 1 is a block circuit diagram of a camera embodying the present invention.

In FIG. 1, a photographic camera apparatus 10 embodying the present invention is shown in simplified block diagram form. The camera apparatus 10 includes an objective lens arrangement or assembly, as shown in simplified fashion at 12, disposed for movement between a plurality of different focal positions which correspond respectively to different camera-to-subject distance ranges. During each film exposure operation, the objective lens assembly 12 is displaced to one of its focal positions for focusing, at a film plane 14, image forming light rays from a photographic subject, as suggested at 16, located within one of the distance ranges from the camera. As is readily apparent, the lens assembly 12 is adapted, at each of its plurality of focal positions, to focus at the film plane 14 an image of a photographic subject located at a different distance from the camera within the corresponding distance range. The lens assembly 12 is preferably driven through its plurality of different focal positions in a manner to be described in greater detail herein and may be releasably held at any one of its different focal positions by lens stopping means including a releasable lens pawl 20 which also will be described in greater detail later.

When lens assembly 12 is at its initial terminal position, it operates to focus image forming light rays from a photographic subject located at the closest possible distance range to the camera within the aforementioned camera-to-subject distance ranges and when in its other terminal position (phantom lines) operates to focus image forming light rays from a photographic subject located at the furthest possible distance range from the camera within the aforementioned camera-to-subject distance ranges. The movement of the lens assembly 12 from its initial terminal position toward its other terminal positions operates to progressively focus image forming rays for corresponding subjects located at progressively increasing distance ranges from the camera.

Camera 10 is also provided with a sonic rangefinder as shown generally at 22 and which is more fully described in U.S. Pat. No. 4,199,246 entitled "Ultrasonic Ranging System For A Camera" by J. Muggli, issued Apr. 22, 1980, and U.S. Pat. No. 4,167,316 entitled "Sonar Controlled Lens Focus Apparatus" by B. Johnson et al., issued Sept. 11, 1979 in common assignment herewith and now incorporated by reference herein.

The sonic rangefinder 22 includes a range signal transmitting circuit 24 which is actuated in a manner to be described later to issue a transmit commence signal to a sonic transducer 28 so as to cause therefrom the transmission of a sonar ranging signal comprising a burst of sonic energy as suggested at 30. Thereafter, the transducer 28 operates to detect an echo signal reflected from the photographic subject 16. An echo detector circuit 32 connected to transducer 28 then provides a signal indicative of the elapsed time between the transmission of the sonar ranging signal and the detection of the echo signal which corresponds directly to the distance between the camera and the subject 16. The manner in which the ranging information provided by rangefinder 22 is utilized in camera 10 will become apparent later on in the disclosure.

Between the objective lens arrangement 12 and the film plane 14 there is provided a shutter mechanism that is shown generally at 34 comprising two overlapping shutter blade elements 36 and 38 (see FIGS. 2-4) of the so-called scanning type which will be described in greater detail later herein. Camera 10 is also provided with a photographic cycle initiating button, shown at 40 in FIG. 1, which is manually actuable to commence an exposure interval by ultimately affecting the release of the shutter blade elements 36 and 38 in a manner to be described later.

Figure 2:
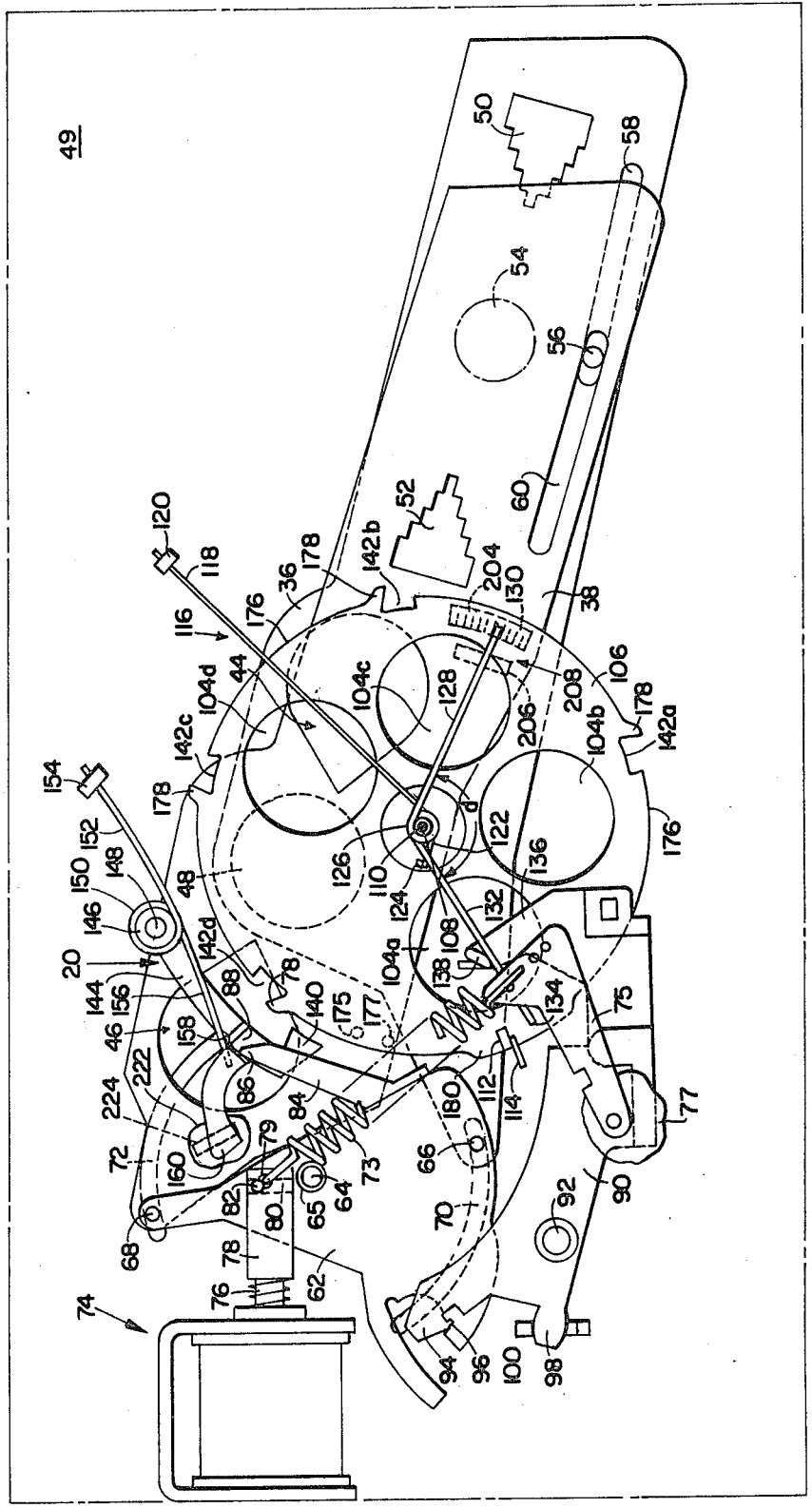
FIG. 2 is a front elevational view showing portions of an automatic lens focusing system and shutter blade mechanism.
Figure 3:
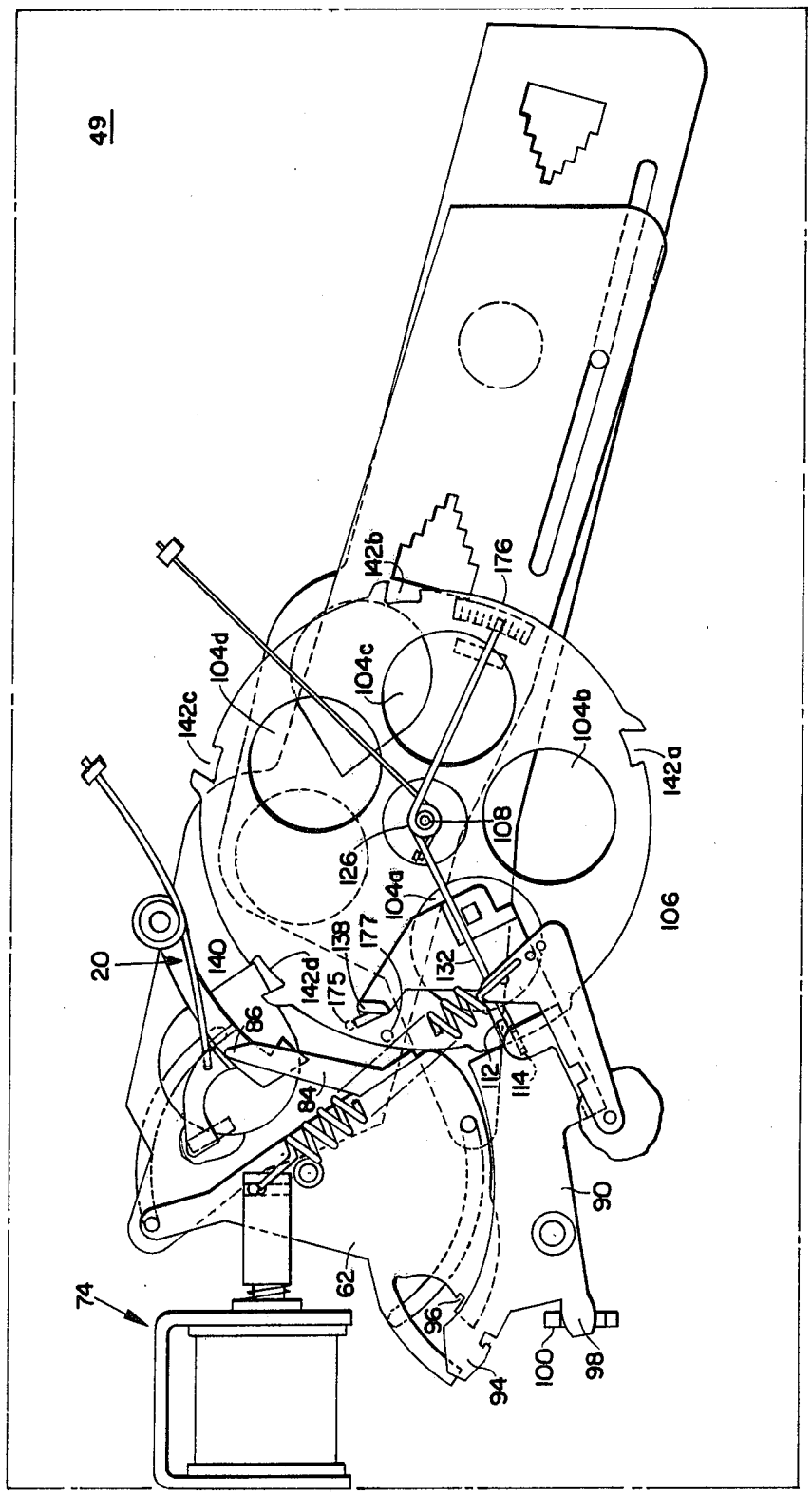
FIG. 3 is similar in some respects to FIG. 2 but shows a shutter latch and lens disc actuator in an unlatching position.
Figure 4:
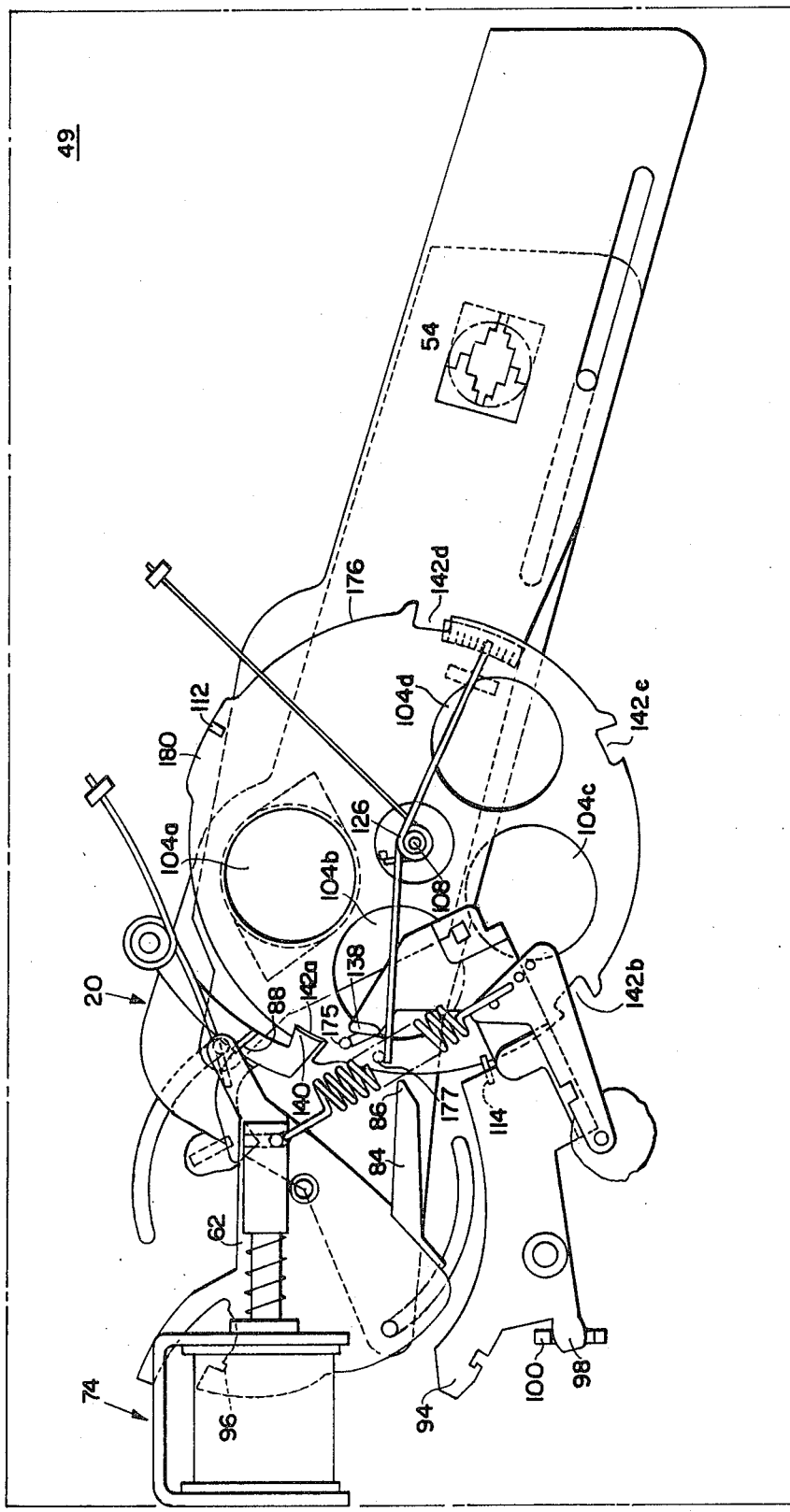
FIG. 4 is a front elevational view showing portions of the automatic lens focusing system and shutter blade mechanism in still another position.

Referring now to FIGS. 2-4, it will be seen that a pair of scene light admitting primary apertures 44 and 46 are provided respectively in the blade elements 36 and 38 to cooperatively define a progressive variation of effective aperture openings in accordance with simultaneous longitudinal and lateral displacement of one blade element with respect to the other blade element in a manner fully described in U.S. Pat. No. 3,942,183 entitled "Camera With Pivoting Blades" By G. Whiteside, issued Mar. 2, 1976 and assigned in common herewith. The apertures 44 and 46 are selectively shaped so as to overlap a light entering exposure opening 48 in a base block structure 49 mounting various components, thereby defining a gradually varying effective aperture size as a function of the position of the blade elements 36 and 38.

Each of the blades 36 and 38 may additionally configured to have corresponding photocell sweep secondary apertures shown respectively at 50 and 52. Secondary apertures 50 and 52 may be configured in correspondence with the shapes of the scene light admitting primary apertures 44 and 46. As is readily apparent, the secondary apertures 50 and 52 also move in correspondence with the primary apertures 44 and 46 to define a small secondary aperture for admitting the passage of scene light to a light detecting or photoresponsive element 54 mounted in the base block 49 as best seen in FIG. 4.

Projecting outwardly from the base block 49 at a location spaced to the right side of the exposure opening 48 is a pivot pin or stud 56 which pivotally and translatably engages elongated slots 58 and 60 formed, respectively, in the shutter blade elements 36 and 38. Pin 56 may be integrally formed with the base block 49 and the blade elements 36 and 38 may be retained in engaging relation with respect to the pin 56 by any suitable means such as peening over the outside end of pin 56.

The opposite ends of the blade elements 36 and 38 include extended portions which pivotally connect to a walking beam 62. The walking beam 62, in turn, is disposed for rotation relative to the base block 49 by a pivotal connection to a projecting pivot pin or stud 64 which may be integrally formed with the base block 49 at a location to the left of exposure opening 48. The walking beam 62 may be pivotally retained with respect to the pin 64 by any conventional means such as the illustrated snap ring 65.

In a preferred embodiment, the walking beam 62 is pivotally connected at its distal ends to the shutter blade elements 36 and 38 by respective pin members 66 and 68 which extend inwardly from the walking beam toward base block 49. Pin members 66 and 68 are preferably circular in cross-section and extend through respective openings in blade elements 36 and 38 so as to slidably engage corresponding arcuate tracks or channels 70 and 72 which may be integrally formed in the base block 49. The arcuate channels 70 and 72 operate to inhibit disengagement of the blade elements 36 and 38 from their respective pin members 66 and 68 during operation of the exposure control system. Thus, the walking beam 62 and the shutter blade elements 36 and 38 collectively define a blade mechanism together with a means for mounting the blade mechanism for displacement including the pivot pins 56 and 64.

Drive means are provided for displacing the blade mechanism 34 and include an opening tension spring 73 and a tractive electromagnetic device such as a solenoid, shown generally at 74, for rotating walking beam 62 to displace the shutter blade elements 36 and 38 with respect to each other and the base block 49 in a manner to be subsequently described herein. The tension spring 73 is connected at one end to an anchor member 75 which may be secured to structure on an outside cover plate 77 oppositely spaced in front of base block 49; and at its other end to an outwardly extending post 79 on walking beam 62 so as to yieldably bias the walking beam 62 to rotate in a clockwise direction about pivot pin 64.

The solenoid 74 includes an internally disposed cylindrical plunger unit 76 which retracts inwardly into the body of the solenoid upon energization of the solenoid winding. The solenoid plunger 76 includes an end cap 78 at the outside end thereof together with a vertical slot or groove 80 within the end cap 78 for loosely engaging a pin 82 extending outwardly from post 79. In this manner, the solenoid plunger 76 is attached to the walking beam 62 so that longitudinal displacement of the plunger 76 operates to rotate the walking beam around the pivot pin 64 and thereby displace the shutter blade elements 36 and 38.

The walking beam 62 also controls operation of the lens pawl 20 and therefore additionally includes an integrally formed pawl actuator arm portion 84 extending outwardly therefrom to define an integral tapered outside end section 86 having a rounded tip. The end section 86 is configured to be received in a generally conforming notch portion 88 on the lens pawl 20 for reasons which will become more apparent later.

Figure 3A:
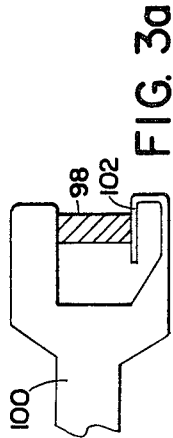
FIG. 3A is a cross-sectional view taken along the line 3A—3A in FIG. 3.

In order to maintain the shutter blade elements 36 and 38 in their scene light blocking arrangement, wherein apertures 44 and 46 do not overlap at all, such as in FIGS. 2 and 3, without requiring the continuous energization of the solenoid 74, there is provided a combined walking beam latch and lens actuator member 90 disposed for rotation about a pivot pin or shaft 92 which may be integrally formed with the base block 49. At its upper left-hand end, the latch and actuator member 90 includes an inwardly projecting integrally molded latch tang 94 which is operative when member 90 is in its latching position of FIG. 2 to extend into the locus of travel of the walking beam 62 to engage a notch or detent 96 thereon for inhibiting clockwise rotation of the walking beam 62 by the tension spring 73. Spaced below the latch tang 94, the latch and actuator member 90 further includes a longitudinally extending arm 98 engaged by the end of an actuator arm 100 which generally defines a yoke having one side portion thereof formed by an integral spring finger 102 as best shown in FIG. 3A. The actuator arm 100 is moved downwardly and then upwardly in a manner more fully described in U.S. Pat. No. 4,040,072 entitled "Shutter Latch Arrangement Releasable Through Shutter Blade Actuation And Resettable Through Film Advancement" by B. Johnson et al., issued Aug. 2, 1977, and operates to first impart counterclockwise rotation to the latch and actuator member 90 in a manner as will be more fully described herein.

In a preferred embodiment, the aforementioned objective lens arrangement 12 comprises a plurality of different lens elements 104a–104d mounted on a disc-like lens holding member 106 disposed for rotation about a center pivot pin or axis 108 which may be integrally formed and project outwardly from the base block 49. In a preferred illustrated embodiment, disc 106 is a unitary piece part molded from clear optical quality plastic with the lens elements 104a–104d integrally molded therein in circumferentially spaced apart relation and also including an integrally formed center hub 110 that is configured to receive the pivot pin 108.

Each of the lens elements 104a–104d has a different focal length and depth-of-field characteristic and corresponds respectively to a different one of the aforementioned plurality of focal positions as is more fully described in U.S. Pat. No. 4,192,587 entitled "Proportional Fill Flash" by A. LaRocque et al. issued Mar. 11, 1980 in common assignment herewith and now incorporated by reference herein. Typical camera-to-subject distances for the lens elements 104a–104d may be approximately 2.6 feet, 3.8 feet, 9 feet and 24 feet, respectively.

As is now readily apparent, rotation of the lens holding disc 106 about the pivot pin 108 from its initial position shown in FIGS. 2 and 3 operates to sequentially move each of the lens elements 104a–104d into position overlying the exposure opening 48 in the base block 49 so as to sequentially focus images onto the film plane 14 of the camera of photographic subjects located at progressively increasing distance ranges from the camera.

Those skilled in the art will understand that additional lens elements (not shown) may be provided in fixed optical alignment with the exposure opening 48 and cooperate with lens elements 104a–104d to define the objective lens arrangement 12 for the camera 10. Thus, one of the lens elements 104a–104d may be entirely omitted, with an open space provided in its place whereupon the additional lens elements provided in optical alignment with exposure opening 48 to define the camera objective lens when the open space is rotated into position over the exposure opening 48. The lens elements 104a–104d preferably would be relatively weak in comparison with other lens elements (not shown) in optical alignment therewith.

The lens holding disc 106 is spring biased for counterclockwise rotation about pin 108 toward its initial position of FIG. 2, where an outwardly extending integrally formed acceleration tab 112 on the outer peripheral section of disc 106 engages a fixed stop pin 114 mounted on the cover section 77, by a first torsion spring 116. Torsion spring 116 has its center portion coiled about hub 110 and includes a first relatively long spring arm 118 having its end fixedly secured to a tab 120 on base block 49, and a shorter arm 122 captured in an integrally molded detent 124 on disc 104 adjacent hub 110.

Means for effecting clockwise rotation of lens disc 106 about pivot pin 108 against the bias of torsion spring 116 to sequentially present each of the lens elements in registration with exposure opening 48 is provided in the form of a second torsion spring 126. Torsion spring 126 also has its coiled center portion mounted on hub 110 on top of the coiled portion of torsion spring 116 and includes a fixed arm 128 having its end captured in a selected one of an arcuate array of detents on member 130 formed on the cover plate 77, and its opposite acceleration arm 132 radiating outwardly from hub 110 to locate its distal end 134 in the locus of travel of the upstanding tab 112 on the periphery of disc 106.

As best shown in FIG. 2, the latch and actuator member 90 also serves to releasably hold acceleration arm 132 in a cocked initial position wherein the end 134 of acceleration arm 132 is spaced behind tab 112. It should be noted that stop 114 engages an upper end of tab 112 and that there is sufficient clearance thereunder for the end 134 of acceleration arm 132 to slide under stop 114 and engage tab 112 upon release of arm 132 to impart clockwise rotation to disc 106.

To releasably hold acceleration arm 132 in the initial cocked position, the latch and actuator member 90 includes an elongated portion extending to the right of pivot pin 92 and having a generally triangular upper section 136 that terminates in an upstanding outwardly extending tab portion 138 for engaging a mid portion of acceleration arm 132.

As will become apparent later, in response to the rapid pivotal motion of member 90 in a counterclockwise direction about pivot pin 92 to the shutter unlatching position shown in FIGS. 3 and 4, the end portion 136 of member 90 having tab 138 thereon moves upwardly to thereby release acceleration arm 132 which pivots in a clockwise direction to strike tab 112 to effect clockwise rotation of disc 106. In response to clockwise rotation of member 90 back to its shutter latching position, tab 138 reengages acceleration arm 132 and moves it back therewith to its energy storing initial position of FIG. 2. Thus, in addition to its function of releasably latching the shutter blade mechanism 34 through its operative association with walking beam 62, member 90 also serves to releasably hold the acceleration arm 132 of torsion spring 126 in its initial energy storing cocked position; to release arm 132 for engagement with tab 112 to effect disc rotation in a clockwise manner; and thereafter to recock the disk drive means or torsion spring 126 by moving acceleration arm 132 from its second terminal position back to its initial position.

The clockwise rotation of disc 106 is stopped selectively by the operation of lens pawl 20 which includes a tang portion 140 thereon that is configured to be received in any one of four notches 142a–142d disposed about the periphery of disc 106 in circumferentially spaced apart relation for locating a corresponding one of the lens elements 104a-104d respectively in registration with the exposure opening 48. The configuration of notches 142a-142d will be described in detail later on.

The lens pawl 20 includes a pivot arm 144 which terminates at one end in tang 140 and has at its other end an integrally formed hub section 146 which is adapted to receive a pivot pin 148 integrally formed and extending outwardly from the base block 49. Integrally formed on the outwardly facing surface of arm 144 adjacent tang 140 is the previously-noted, generally conforming notch or detent 88 for receiving the tapered end portion 86 of the pawl actuator arm 84 on walking beam 62. Pawl 20 is spring biased for counterclockwise rotation about pivot pin 148 by a torsion spring 150 having its coiled center portion wrapped about hub 146 and including a first spring arm 152 having its end captured in a tab detent 154 on base block 49 and a second spring arm 156 having its end portion in engagement with a tab 158 on arm 144. Extending outwardly from arm 144 on the side opposite tang 140, is a generally arcuate shaped arm 160 which will serve a useful purpose in a calibration test for adjusting the speed of rotation of disc 106 as will be described later on.

With walking beam 62 held by latch and actuator member 90 in its latched position of FIG. 2, the pawl actuator arm 84 releasably holds the lens pawl 20 in a retracted initial position against the bias of torsion spring 150 wherein the tang 140 is spaced from the peripheral section of disc 106 allowing free rotation of the disc 106 about pivot pin 108. As will become apparent later, in response to clockwise rotation of walking beam 62, the corresponding pivotal motion of actuator arm 84 will allow pawl 20 to pivot in a counterclockwise direction under the bias of spring 150 to engage the peripheral edge of disc 106 and then become operatively seated in an appropriate one of the notches 142a-142d to stop rotation of disc 106.

The camera 10 embodying the present invention may also be provided with an integral electronic flash or strobe system (not shown). The strobe charging and triggering circuitry may be of the type well known in the art as is more fully disclosed in U.S. Pat. No. 4,064,519 entitled "Regulated Strobe For Camera With Sixth Flash Inhibit" issued Dec. 20, 1977 in common assignment herewith. The strobe system preferably derives charging power from a flat battery that is insertable within the camera in correspondence with the film pack or cassette in a manner that is well known in the art relating to Polaroid SX-70 type film cassettes and cameras.

This flat battery in the film cassette is also preferably utilized to power the circuitry in FIG. 1 in its entirety by the way of three switches, S1, S2 and S3 in a manner more fully described in the previously-noted U.S. Pat. No. 4,040,072. Camera 10 is also provided with a motor and solenoid control circuit 162 which operates in a manner also more fully described in the last mentioned patent.

As is readily apparent, the motor and solenoid control circuit 162 operates to control the energizing current delivered to the solenoid 74 and to an electrical motor 164. The film units intended for use with camera 10 are preferably of the self-developing type and the motor 164 is provided to effect the advancement and processing of the self-developing film units in a well-known manner.

The sonar ranging signal 30 is derived from a clock circuit 166 which is powered upon closure of the switches S1 and S2 in a manner to be subsequently described herein. The clock pulse from circuit 166 is directed to a transmit control circuit 168 which controls the transmission of the clock pulse to the sonic rangefinder 22 as a function of a logic signal derived upon closure of the switch S3. The output clock pulse from the transmit control circuit 168 is also directed to a frequency divide circuit 170 which operates to reduce the frequency of the clock pulse and thereafter direct the reduced frequency clock pulse to the input of a multistage binary counter 172. The output from counter 172 is thereafter utilized to sequence an inverter latch network 174 comprising a plurality of inverter latch circuits. Additionally, inverter latch network 174 receives the output from echo detector circuit 32. The output from inverter latch network 174 is fed to the motor and solenoid control circuit 162.

To initiate a photographic exposure cycle, the operator manually actuates button 40 so as to close switch S1 in a manner more fully described in the previously-noted U.S. Pat. No. 4,040,072. The closure of switch S1, in turn, operates to energize the motor and solenoid control circuit 162 which, in turn, energizes the solenoid 74 to retract the plunger 76 inwardly and rotate the walking beam 62 in a counterclockwise direction from its normal at rest position shown in FIG. 2 to the position shown in FIG. 3. During this counterclockwise rotation, the pawl actuator arm 74 effects clockwise rotation of the lens pawl 20 about pivot pin 148 from its position shown in FIG. 2 to its position shown in FIG. 3.

Referring now to FIG. 3, it can also be seen that the aforementioned clockwise rotation of the walking beam 62 operates to displace detent 96 out of engagement with the latch tang 94 on latch and actuator member 90. Member 90 is thereafter rotated in a counterclockwise direction about its pivot pin 92 by the downward movement of the actuator arm 100 which results directly from the previously-noted manual actuation of the button 40 in a manner more fully described in previously-noted U.S. Pat. No. 4,040,072. In this manner, the latch and actuator member 90 is rotated from its latching position of FIG. 2 to its unlatching position of FIG. 3, thereby allowing the subsequent rotation of the walking beam member 62 in a clockwise direction toward its maximum aperture defining position upon the de-energization of solenoid 74. Movement of the actuator arm 100 in the downward direction to effect release of member 90 also operates to sequentially effect the closing of the switches S2 and S3 in a manner that is again more fully described in U.S. Pat. No. 4,040,072.

This counterclockwise rotation of member 90 also moves portion 136 and the acceleration arm holding tab 138 thereon upwardly to thereby release acceleration arm 132 for rotation in a clockwise direction. As shown in FIG. 3, the end 134 of acceleration arm 132 has moved forwardly to engage tab 112 and impart clockwise rotation to the disc 106. Once the end 134 of acceleration arm 132 engages tab 112 its further clockwise rotation is slowed down somewhat by the inertia of the disc system allowing section 136 of member 90 to moved forward at a more rapid rate to the position shown in FIG. 3 thereby providing sufficient clearance for further clockwise rotation of acceleration arm 132 to accelerate disc 106 to its operational velocity. As best shown in FIGS. 3 and 4, an energy absorbing stop, such as the resiliently deformable cylinder 175, may be provided on cover plate section 77 in position to be engaged by the upper tip of tab section 138 to preclude bouncing of member 90 occassioned by its rapid deceleration at the unlatching position.

As best shown in FIG. 4, acceleration arm 132 continues to drive the lens disc 106 by its engagement with tab 112 until the end 134 of acceleration arm 132 is stopped by a stop pin 177 on the interior of cover section 77 in the locus of travel of the end 134 of acceleration arm 132.

Movement of the acceleration arm from its initial cocked position of FIG. 2 to its terminal position of FIG. 4 effects acceleration of the disc 106 to a substantially constant rotational velocity for sequentially presenting each of the lens elements 104a–104d at the exposure opening 48.

Closure of the switch S3, in turn, operates to power down the solenoid 74 from the initial high current energization condition required to retract the plunger 76 to a low current energization condition required to hold the plunger in its retracted position as shown in FIG. 3 in a manner more fully described in the previously-noted U.S. Pat. No. 4,192,587. The closing of switch S3 also operates to actuate the sonar rangefinder 22 to transmit the sonar ranging signal 30 by providing the requisite logic signal to the transmit control circuit 168 so as to transmit the clock pulse from the clock circuit 166 to the range signal transmitting circuit 24. The transmit control circuit 168 also directs the clock pulse to the frequency divide circuit 170 so as to trigger the counter 172 in correspondence with the transmission of the sonar rangefinding signal 30.

As is more fully described in copending, commonly-assigned U.S. patent application Ser. No. 156,044 filed on June 3, 1980 by J. Bagdis et al. and entitled "Autofocus Camera With Electronic Lens Disc Pawl Release Arrangement", the counter 172 which was triggered upon transmission of the sonar ranging signal 30 sequentially provides a series of predetermined timed outputs to inverter latch network 174 correlating the position of each of the lens elements 104a–104d with respect to the exposures opening 48 as the disc rotates. Upon detection of the echo signal, circuit 34 also provides an indication to network 174 which is indicative of camera-to-subject distance. The inverter latching network acts as a logic subsystem in response to these inputs and insures that its output to circuit 162 for de-energizing solenoid 74 and thereby causing clockwise rotation of the walking beam 62 which will result in the release of the lens pawl 20, to occur only at such times as will allow the lens pawl tang 140 to engage the periphery of disc 106 in the space between adjacent notches. This is to make sure that the tang 140 does not first engage the disc at the edge of one of the notches 142 which may cause the pawl 20 to bounce inadvertently and miss being received in the appropriate notch 142.

Thus, upon provision of the output from network 174 the solenoid 74 is de-energized causing the tension spring 73 to pivot walking beam member 62 in a clockwise direction about pivot pin 64 thereby releasing the lens pawl 20 for movement to locate tang 140 between a pair of notches 142a–142d. The timing is such that tang 140 will engage the peripheral edge ahead of the approaching notch 142 that is appropriate for locating the lens, corresponding to the subject range indicated by the echo detector circuit output at the focusing position in registration with exposure opening 48. A more detailed description of the configuration of the notches 142 and the interaction of lens pawl 20 will appear later herein.

As best shown in FIG. 4, the tang 140 of lens pawl 20 has been received in notch 142a to locate lens element 104a in registration with exposure opening 36.

As the proper lens element 104 is stopped at the focusing position, walking beam 62 continues to rotate in the clockwise direction. Such rotation effects movement of the blade elements 36 and 38 causing their respective primary apertures 44 and 46, which up until this point have been out of overlapping relation thereby blocking exposure opening 48, to progressively overlap and define an exposure aperture which increases in size in response to further progressive displacement of the blade members. Such blade movement also causes the secondary apertures 52 and 54 to overlap and unblock the photocell 54 which is monitoring scene lighting conditions. Photocell 54 forms part of a light integrating network (not shown) which provides a trigger signal to circuit 162, when a sufficient quantity of light has been transmitted through opening 48 to properly expose the film unit causing the reenergizing of solenoid 74 to retract plunger 76 in thereby pivot walking beam 62 in a counterclockwise direction from the position of FIG. 4 to the position of FIG. 3 to move blade elements 36 and 38 to the exposure terminating closed position.

Such rotation of walking beam 62 causes the pawl actuator arm 84 thereon to pivot lens pawl 20 in a clockwise direction to withdraw tang 140 from notch 142a and thereby free the disc 106 for counterclockwise rotation back to its initial position under the influence of torsion spring 116.

As this is happening, circuit 162 also energizes motor 164 and it operates various components in the camera including the film advancing and processing mechanisms and elements of a gear train which effect the movement of actuator arm 100 upwardly to pivot the shutter latch and lens actuator member 90 in a clockwise direction about pivot 92 from the unlatching position shown in FIGS. 3 and 4 back to the latching position shown in FIG. 2. In response to such movement, the tab 138 on section 136 re-engages the acceleration arm 132 and moves it in a counterclockwise direction back to the initial cocked position. Near the end of the motor energization cycle, mechanical elements within the camera are moved into position for opening switches S2 and S3 to thereby de-energize the system. Upon de-energization of solenoid 74, the walking beam 62 pivots in a clockwise direction a short distance, to the position of FIG. 2, under the influence of tension spring 73 to once again re-engage the latching detent 96 thereon with the latch tang 94 on member 90.

Those skilled in the photographic art will appreciate that the elapsed time period from the beginning to the end of the automatic lens focusing portion of the camera cycle is relatively short. For example, as more fully described in the previously-noted copending application U.S. Ser. No. 156,044, the disc 106 is stopped by the lens pawl 20 to locate the first lens element 104a at the focusing position within approximately 25 milliseconds after cycle initiation. The elapse time for stopping the last lens element 104d at the focusing position is approximately 80 milliseconds.

To insure that such rapid operation is performed reliably on a consistant basis, it is essential for the lens drive system, in the form of torsion spring 116, to quickly and smoothly accelerate the lens disc 106 to a substantially constant rotational velocity and for the lens pawl 20 to interact dynamically with the lens disc 106 and the notches 142a–142d therein in a consistent and reliable manner to stop the disc 106 by dissipating its inertial energy in such a way to minimize disc oscillation and also to stabilize the position of the disc 106 at each of its four focusing locations to accurately align the corresponding one of the lens elements 104a–104d with the exposure opening 48.

First, we will look at the dynamic interaction of the lens pawl 20 with disc 106.

As best shown in FIGS. 2–4, the outer peripheral edge 176 of disc 106 is at a constant radial distance from pivot pin 108 except for further outwardly radiating tabs 178 located at the trailing end portion of each of the notches 142a–142d; and an elongated outwardly projecting portion 180 mounting the acceleration tab 112. The reason for portion 180 is to mount the acceleration tab 112 as far outboard from pivot 108 as is possible without interfering with other components to thereby maximize the torque arm.

Figure 5:
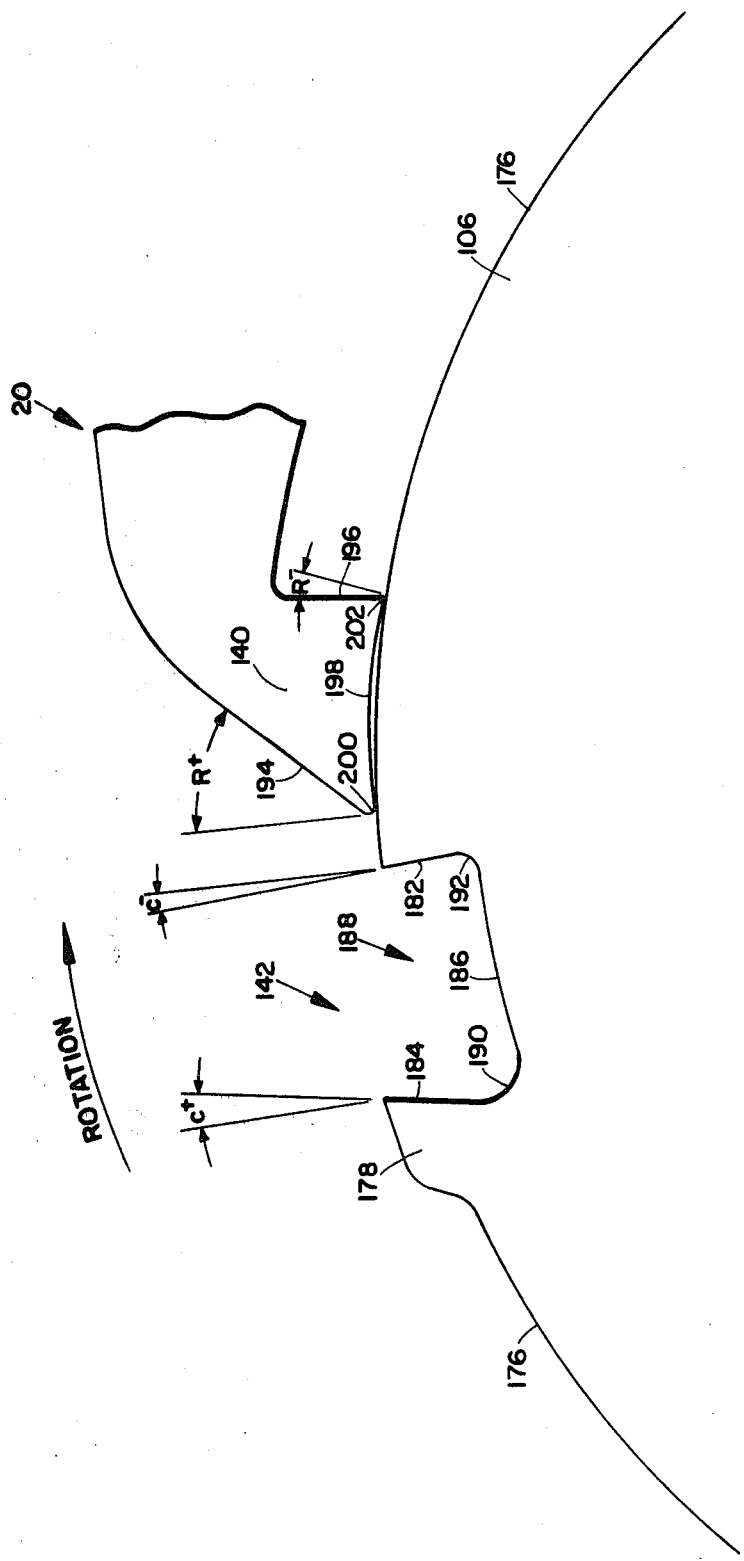
FIG. 5 is an elevational view showing the tang of a lens pawl riding along the peripheral edge of a lens disc.

With reference to FIG. 5, it will be seen that each of the notches 142a–142d includes a short angled leading edge or side cam surface 182; an oppositely-spaced longer angled trailing edge or side cam surface 184 which is formed in part by the front edge of the corresponding tab 178 to extend outwardly in a radial direction beyond the peripheral edge 176; and a bottom surface 186 which is spaced oppositely the notch entry opening 188 between the upper ends of cam surfaces 182 and 184. The transition zone between the lower end of cam surface 184 and bottom surface 186 is formed as a curved ramp section or radius 190. The curved transition zone 192 between the bottom of cam surface 182 and bottom surface 186 has a smaller radius than ramp section 190.

The longer trailing side cam surface 184 has a positive rake or cam angle with respect to the direction of rotation of disc 106 (clockwise) to sequentially present the lens elements at the exposure opening 48, while the shorter leading side cam surface 182 has a negative rake or cam angle. For the purposes of this disclosure, positive rake means that the cam angle, C, between the perpendicular or radial line passing through the outermost tip of surface 184 and an outwardly directed extension of surface 184 is positive (i.e., in the same direction as the clockwise rotation arrow). Conversely, the cam angle, C, for surface 182 is negative with respect to the perpendicular and oppositely directed with respect to the clockwise rotation arrow. Cam surface 184 is set at a larger cam angle, C, than cam surface 182.

It may be helpful at this point to specify some of the dimensions to more clearly visualize the construction of a typical disc 106. The following dimensions are given in inches. The radial distance to peripheral edge is 0.670. The radial distance to the outermost tip of tab 178 is 0.700 so that the extension of surface 184 beyond edge 176 is 0.030. The radial distance to the bottom surface 186 of notch 142 is 0.605. The notch entry opening 188 is 0.148 as measured between the outside ends of surfaces 182 and 184. The angular relations are as follows. Cam surface 184 is set at a cam angle of 20°. The shorter cam surface 182 is set at a cam angle of 5°. The radius, in inches, of transition ramp 190 is 0.030; and for ramp 192, 0.015. These dimensions are to be considered approximate and are provided to show the geometric relationships of the various identified surfaces and therefore are not to be considered a limitation on the scope of the invention herein involved.

As will become apparent later, the cam surfaces 184 and 182 serve to cam the tang 140 of lens pawl 20 into notch 142 and their respective cam angles are set to provide appropriate camming action at the point where they intersect with intersecting lines of action drawn from the pivot center 108 of disc 106 and the pivot center 148 of lens pawl 20.

The tank 140 on lens pawl 20 includes a leading edge or surface 194 that has a positive rake angle, R, that is greater than the cam angle, C, for notch cam surface 184; and oppositely spaced trailing edge or surface 196 set at a negative rake angle that is greater than the cam angle, C, for notch cam surface 182; and a concave bottom edge or surface 198 joining the lower end of surfaces 194 and 196 at leading and trailing end tips, 200 and 202 respectively. It will be noted that bottom surface 198 is formed to have a smaller radius of curvature than the outer peripheral surface 176 so that when the lens pawl 20 is released by arm 84 on the walking beam 62 and is rotated in a counterclockwise direction about pivot 148 by torsion spring 150 the engagement of tang 140 with edge 176 is at the leading and trailing tips 200 and 202.

The span of bottom surface 198, as measured between tips 200 and 202, is 0.146 inches which is slightly narrower than the notch opening 188 (0.148 inches). The radius of curvature of surface 198 is 0.400. The rake angle for surface 194 is 25° and for surface 196 is 11°.

As noted earlier, the release of the lens pawl 20 for movement toward disc 106 is electronically controlled and correlated to the speed of disc rotation so that the tang 140 initially engages the disc in the space between adjacent notches defined by peripheral edge 176 whereby it rides therealong until its leading tip 200 engages the portion of cam surface 184 that extends outwardly beyond edge 176 and tang 140 is cammed downwardly into the notch 142.

In preparation for driving tang 140 into notch 142, it is highly desirable that the lens pawl 20 be in a stabilized condition as tang 140 rides along surface 176. For this reason, it is preferable to configure surfaces 176 so that it has a constant radius. That is, the tips, 200 and 202, are held in engagement with surface 176 due to the biasing influence of torsion spring 150 and because there is no variation in radius as tang 140 rides along surface 176 there will be no pivotal motion of lens pawl 20.

Figure 6:
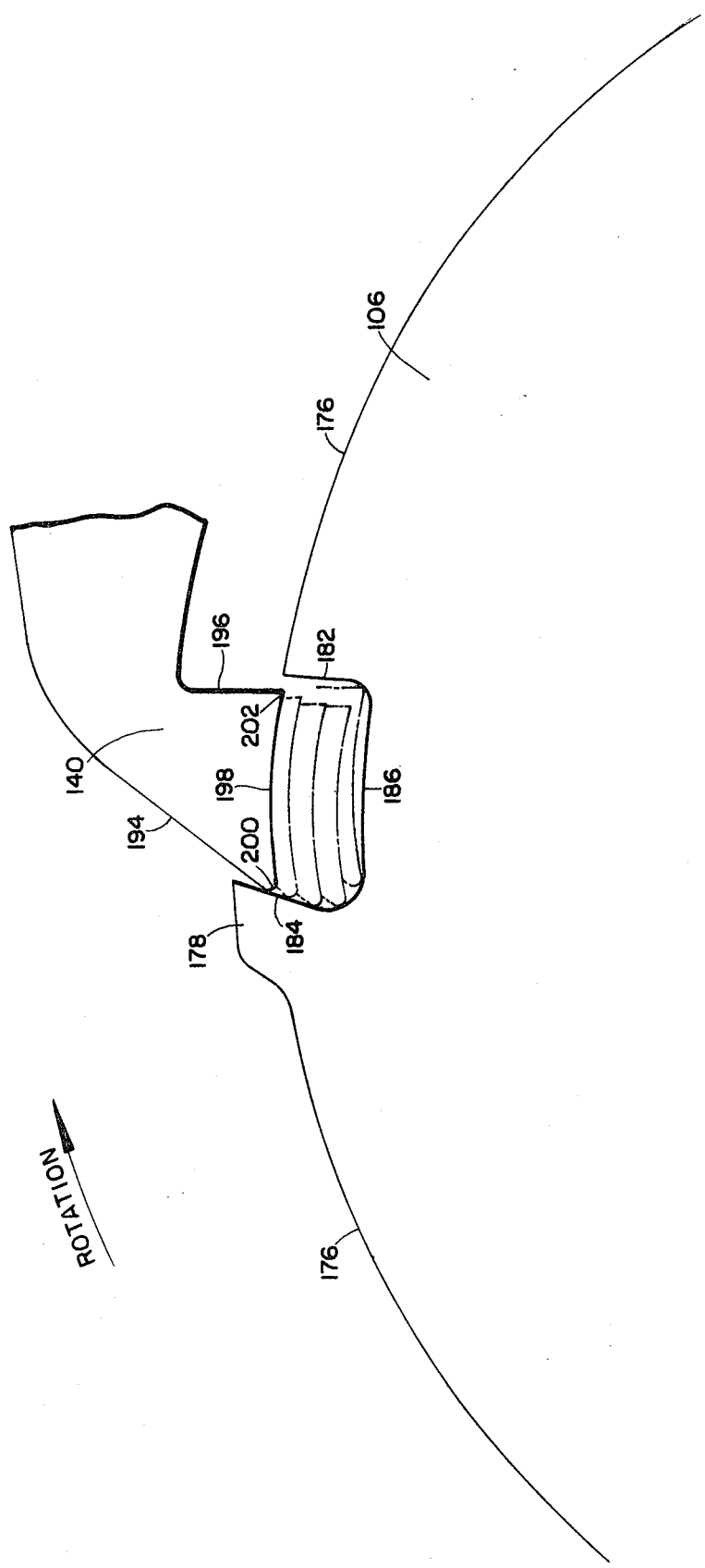
FIG. 6 is an elevational view that is similar in some respects to FIG. 5 but shows the tang of the lens pawl located in a receiving notch along the periphery of the lens disc.

In response to further clockwise rotation of disc 106 from the position of FIG. 5 to the position of FIG. 6, the lens pawl 20 remains in this stabilized condition in that the trailing end tip 202 will remain in contact with surface 176 until a point in time just before the approaching outer end of cam surface 184 engages the leading end tip 200.

Upon engagement of surface 184 with tip 200 on tang 140 and in response to continued rotation of disc 106 in the clockwise direction along with the biasing force provided on lens pawl 20 by torsion spring 150, tang 140 is urged downwardly into the slot as the tip 200 follows the inclined camming surface 184. This camming action dissipates part of the rotational energy of the disc. As tang 140 is cammed further down into notch 142 tips 200 rides along the radius section 190 which, as determined by high speed movies, tends to provide a substantial energy dissipation function to promote stopping of the disc with a minimum of oscillation. In some instances, it has been observed that engagement of tip 200 with the radius section 190 causes slight rotation of the disc 106 in the opposite (counterclockwise) direction. If the impact of surface 184 on tip 200 does cause some rebound or a slight rotation of disc 106 in the opposite direction, then the trailing end tip 202 will engage and follow the cam surface 182 which also will provide a downward camming action on tang 140 in response to such counterclockwise rotation. The camming angle of surface 182 is shallower than that of surface 184 because it operates when the tang 140 is further down into the notch 142 and is at a different geometric relation with the pivot points of the disc 106 and the lens pawl 20. It will be noted that the steeper rake angles of tang surfaces 194 and 196 provide sufficient clearance with respect to cam surfaces 184 and 182 to insure that the cam following action of the tang is restricted to tips 200 and 202 for better control and more reliable operation.

When the disc 106 is stopped, cam surface 182 is urged into engagement with the trailing end tip 202 of tang 140 due to the gentle counterclockwise bias on disc 106 provided by the torsion spring 116. Thus, the trailing end tip 202 serves as a precisely located stop against which surface 182 bears to accurately locate the corresponding lens disc in registration with the exposure opening 48.

At the end of the exposure cycle, when walking beam 62 is pivoted in a counterclockwise direction to effect clockwise rotation of lens pawl 20 to its retracted position, tip 202 rides upwardly along cam surface 182 and imparts a slight amount of clockwise rotation to disc 106 against the bias of torsion spring 116 to facilitate withdrawal of tang 140 from notch 142. Once tang 140 is clear of notch 142, the torsion spring 116 provides the energy to effect rotation of disc 106 in a counterclockwise direction back to its initial position of FIG. 2 where the upper end of acceleration tab 112 comes into engagement with stop pin 114.

The velocity at which lens disc 106 rotates in a clockwise direction to sequentially present each of the lens elements 104a–104d at the exposure opening 48 is a function of the inertial mass of disc 106, the friction of the disc pivot, the clockwise torque applied by disc drive spring 126 through its acceleration arm 132 and the smaller oppositely directed torque applied by the disc return spring 116 through its short spring arm 122.

Obviously, for the lens focusing system to operate properly, the rotational velocity of disc 106 must be set accurately to fall within an allowable range. In the interests of manufacturing and calibration economy, it is highly desirable to provide a simple and accurate method for measuring disc velocity and easily manipulated structure for adjusting disc velocity if it is found to be out of the desired allowable range.

In a preferred embodiment, the lens focusing system is configured to easily adjust the clockwise torque applied to the disc 106 by the drive spring 126 for controlling disc velocity in the clockwise direction.

The clockwise torque applied to disc 106 is the product of the torsion arm (radial distance between the disc pivot 108 and the acceleration tab 112) and the force applied to tab 112 during the angular displacement of acceleration arm 132 from its cocked position of FIG. 2 to its terminal position of FIG. 4. The drive force imparted by acceleration arm 132 is, in turn, measured by the difference in the energy stored in spring 126 at its cocked position of FIG. 2 and the lower amount of energy stored in spring 128 at the terminal position of FIG. 4 resulting from dissipation by the angular displacement of acceleration arm 132 away from the fixed arm 128. Because the angular displacement of acceleration arm 132 is constrained within a fixed angular range by tab 138 on member 90 at the cocked position and by stop 177, changes in the drive force may be most readily made by changing the amount of energy stored in spring 150 located at its initial cocked position of FIG. 2.

The energy stored in spring 126 at the cocked position is proportional to the displacement angle, d, between the acceleration arm 132 and a fixed arm 128. Since acceleration arm 132 is held at a fixed position determined by the location of tab 138 on latch and actuator member 90 located in its shutter latching and spring cocking position of FIG. 2, the displacement angle, d, may be adjusted to vary stored energy by changing the angular disposition of the fixed arm 128.

As noted earlier, the end of spring arm 128 is configured to be captured in any one of a plurality of detents or notches 204 disposed in an arcuate array on a comb-like detent member 130 formed on the fixed cover plate 77 in front of the lens disc and shutter assembly opposite base block 49. The fixed arm 128 is supported in engaging relation with the detent member 130 by a small bridge member 206 located on cover plate 77 between pivot 108 and the interior edge of detent member 130. An opening 208 in cover plate 77 between bridge 206 and detent member 130 provides access to the spring arm 128 for pushing its end portion inwardly to release it from the detent member 130 and moving it angularly to locate it on another detent 204. The bridge member 206 may be tapered to slope inwardly towards detent member 130 to facilitate such deflection to change the spring position.

If spring arm 128 is moved in a clockwise direction to a lower detent 204, then a displacement angle, d, will decrease and the energy stored in spring 150 at the cocked position will be increased proportionally. Conversely, if spring arm 128 is moved in a counterclockwise direction to a higher detent 204, angle d increases and the energy stored in spring 126 at its cocked position will decrease proportionally. Thus, by moving the fixed arm 128 to different locations along detent member 130, the energy stored in spring 150 at its cocked initial position may be varied to adjust the drive force applied to disc 106.

Figure 7:
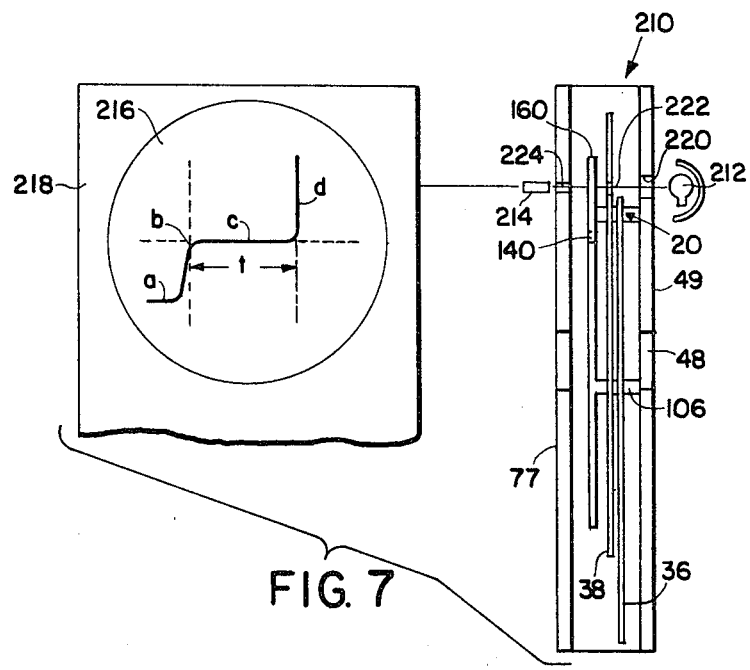
FIG. 7 is a diagrammatic view of a testing and calibration set up for the lens focusing and shutter blade mechanism module.

As shown in diagrammatic form in FIG. 7, the lens focusing and shutter system are configured to be packaged as a modular subsystem 210 with the major components thereof being mounted between the rear base block 49 and the front cover plate 77. Such modular construction facilitates testing and calibration before module 210 is mounted in the camera housing.

The preferred method for deriving an indication of disc velocity is to measure the "ride-time" of the lens pawl tang 140 along the peripheral edge 176 between adjacent notches 142. That is, knowing the length of the edge 176 between notches and being able to measure the elapsed time from the initial contact with edge 176 by tang 40 to the time it is cammed into the approaching notch 142, one can calculate disc velocity. Since ride-time directly correlates to disc velocity, it can be used as a calibration reference for adjusting disc velocity.

In the illustrated preferred embodiment, ride-time of the lens pawl tang 140 is measured electro-optically by observing the pivotal motion of lens pawl 20 utilizing the arcuate arm 160 thereon radiating outwardly from arm 144 in the opposite direction from tang 140. Such pivotal motion of arm 160 is employed to vary the amount of light transmitted through module 210 at a test station from test lamp 212 behind base block 49 to a photocell 214 on the forward side of cover plate 77 which is ultimately displayed as an electronic trace on the face of cathode ray tube 216 of oscilloscope 218. The light transmission path from lamp 212 to photocell 214 is transverse to the pivotal path of travel of arcuate arm 160 on the lens pawl 20 and is defined by an opening 220 in base block 49; and aligned opening 222 in the forward shutter blade 38 and an aligned narrow slit 224 in cover plate 77 shown in dotted lines in FIGS. 2-4 and in solid lines in FIGS. 8 and 9.

Figure 8:
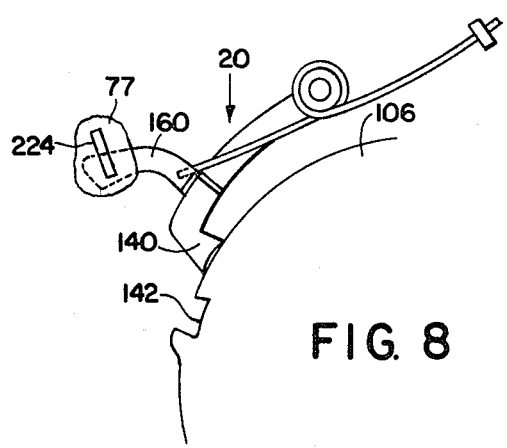
FIG. 8 is an elevational view showing the disposition of an arcuate arm on the lens pawl in relation to a light transmission slit when the tang of the lens pawl is riding along the peripheral edge of the disc.
Figure 9:
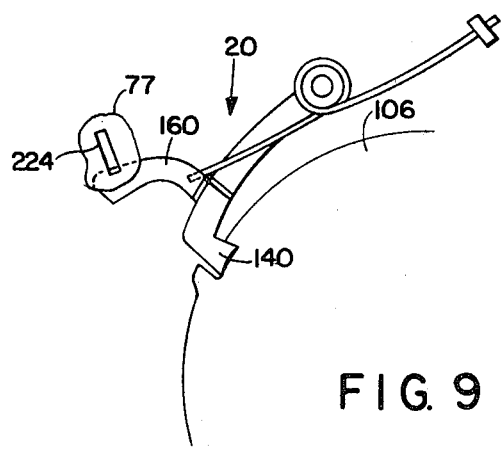
FIG. 9 is similar in some respects to FIG. 8 but shows the disposition of the arcuate arm on the lens pawl when the tang thereof is received in a notch formed in the periphery of the lens disc.

In response to cycle initiation and rotation of the walking beam 62 in a counterclockwise direction to unlatch the shutter, lens pawl 20 pivots in a clockwise direction to the position of FIG. 3 so that arm 160 blocks a major portion of the light output slit 224 and the amount of light transmitted to photocell 214 is at a minimum as indicated by portion A of the trace. In response to echo signal detection and the solenoid de-energizaton command from the inverter gate network 174, the solenoid 74 is deenergized and walking beam 62 rotates in a clockwise direction allowing lens pawl 20 to pivot in a counterclockwise direction to engage tang 140 with the peripheral edge 176 between adjacent notches 142 as shown in FIG. 8. In response to such motion, arcuate arm 160 unblocks a larger portion of slit 224 thereby increasing the amount of transmitted light toward a point indicated at B. During the ride-time, there is no pivotal motion of the lens pawl 20 because the peripheral edge portion 176 is of constant radius. Thus, the light output is constant indicated by the straight horizontal portion C. When the tang 140 is cammed into the approaching notch 142 as shown in FIG. 9, lens pawl 20 pivots abruptly in a counterclockwise direction thereby moving arcuate arm 60 downwardly to further uncover slit 222 and allowing maximum transmission of light indicated by the steeply rising trace portion D. Thus, the length of the flat horizontal portion C provides an accurate indication of ride-time, t, which is directly correlated to disc velocity.

In the calibration operation, the system is operated to measure ride-time. If it is below a predetermined limit, indicating that the lens velocity is too fast, then the position of arm 128 is moved in a counterclockwise direction to a new detent 204 for the purpose of reducing stored energy in spring 126 to reduce disc velocity. Conversely, if the ride-time is too long, indicating the the disc velocity is too low, then the position of arm 128 with respect to the detent member 130 is adjusted to increase the energy stored in the spring 126 for increasing disc velocity.

It should be noted that the constant radius of the lens disc peripheral edge 176 serves two purposes. First, it stabilizes the position of lens pawl 20 during the ride-time in preparation for the camming of tang 140 into notch 142. Also it thereby stabilizes arcuate arm 160 to facilitate providing the smooth trace portion C during testing and calibration to give a more accurate measure of the ride-time, t.

Because certain changes may be made in the abovedescribed apparatus and method without departing from the scope of the invention herein involved, it is intended that all matter contained in the above description or shown in the accompanying drawings shall be interpreted as illustrative and not in a limiting sense.

What is claimed is:

1. A camera including an automatic lens focusing system for automatically focusing image forming light rays from a photographic subject at a camera film plane, said camera comprising:

means for generating and transmitting a sonic ranging signal and for providing an indication upon detection of an echo signal reflected from a photographic subject at an elapsed time, subsequent to transmission of said ranging signal, indicative of camera-to-subject distance;

a plurality of discrete lens elements each having a different focal length;

a disc for holding said plurality of lens elements in circumferentially spaced apart relation to each other for rotation about a center axis of said disc, rotation of said disc from an initial position operating to sequentially move each of said lens elements into position to focus an image onto the film plane of a photographic subject within a corresponding different camera-to-subject distance range, said disc including a peripheral section having a plurality of open outer end tang receiving notches therein extending generally inwardly from an outer edge portion of said peripheral section and being disposed in circumferentially spaced apart relation to each other, each of said notches being arranged in predetermined angular relation to a corresponding one of said lens elements and also being configured to include a leading side cam surface set at a cam angle with negative rake with respect to a radial line passing through an outer tip of said leading side cam surface, an oppositely spaced trailing side cam surface set at a cam angle with positive rake and extending further out in the radial direction than said leading side cam surface, a bottom surface, and a generally concave transition ramp surface extending between a lower portion of said trailing side cam surface and said bottom surface, said outer edge portion being at a constant radial distance from said axis between notches except in the vicinity of the outer ends of said trailing side cam surfaces where it protrudes outwardly to accommodate the extended portion of said trailing side cam surface;

means for effecting rotation of said disc away from said initial position so that each lens element reaches said focusing position at a time subsequent to the provision of a correlated echo signal indicating that the next lens element approaching the focusing position is appropriate for the corresponding camera-to-subject distance range;

means for biasing said disc for rotation back toward said initial position; and means responsive to the provision of the correlated echo signal indication for stopping rotation of said disc to locate said corresponding lens element at said focusing position, said stopping means including a pawl mounted for pivotal motion toward and away from said peripheral section of said disc and having a tang configured to be releasably received in any one of said disc notches to stop disc rotation and inhibit further rotation until it is removed from said notch, said tang including a leading side surface having a positive rake angle that is greater than the cam angle of said trailing side cam surface of said notch, a trailing side surface having a negative rake angle that is greater than the cam angle of said leading side cam surface and a concave bottom surface, having a radius of curvature that is smaller than the radius of curvature of said disc outer edge portion between notches, joining the lower ends of said tang leading and trailing side surfaces and cooperating therewith to define leading and trailing end tang cam follower tips, the span between said leading and trailing tips being narrower than the width of said notch opening, said pawl being locatable at an initial disengaged position wherein said tang is spaced outwardly from said outer edge portion to allow rotation of said disc therepast and in response to said echo signal indication being actuable to pivot toward said disc so that at least one of said leading and trailing end tips engages said outer edge portion of said disc between adjacent notches ahead of an approaching one of said notches and rides therealong whereby said lens pawl is maintained in a stabilized condition due to the constant radius of said outer edge portion until said leading end tip of said tang is engaged by said extended portion of said trailing side cam surface of said approaching notch whereupon in response to further disc rotation toward said focusing position said leading end tip follows said trailing side cam surface and then said concave ramp section to effect camming action of said tang down into said notch to initiate stopping of disc rotation, said trailing end tip of said tang and said leading side cam surface also acting to cam said tang into said notch when engaged due to oscillating action of said disc responsive to abrupt disc deceleration when said tang enters said notch, said disc biasing means serving to bias said disc back toward said initial position to hold said leading side cam surface of said notch in contact with said trailing end tip of said tang located therein to accurately position said disc and thereby locate said corresponding lens element at said focusing position.

2. The camera of claim 1 wherein the action of said tang leading end tip following said concave ramp section of said notch aids in the dissipation of the inertial energy of said disc to facilitate stopping disc rotation with a minimum of oscillation.

3. The camera of claim 1 wherein the span between said leading and trailing end tang tips is only slightly narrower than said notch entry opening for the purpose of extending the ride-time during which said trailing end time remains in contact with said outer edge portion after said leading end tip is projecting into said notch entry opening thereby extending the time wherein said lens pawl is maintained in a stabilized condition.

4. The camera of claim 1 wherein the rake angles of tang leading and trailing side surfaces are sufficiently larger than said corresponding cam angles of said trailing and leading side cam surfaces to provide clearance and thereby restrict contact of said cam surfaces to said leading and trailing end tips of said tang.

5. The camera of claim 1 wherein said cam angle of said trailing side cam surface is greater than said cam angle of said leading side cam surface.

* * * * *